March 30, 1954  A. C. DANKS  2,673,708
FLUID PRESSURE SEALED BUTTERFLY VALVE
Filed Sept. 28, 1950  3 Sheets-Sheet 1

INVENTOR.
ALFRED C. DANKS
BY
Richey & Watts
ATTORNEYS

March 30, 1954  A. C. DANKS  2,673,708
FLUID PRESSURE SEALED BUTTERFLY VALVE
Filed Sept. 28, 1950  3 Sheets-Sheet 2
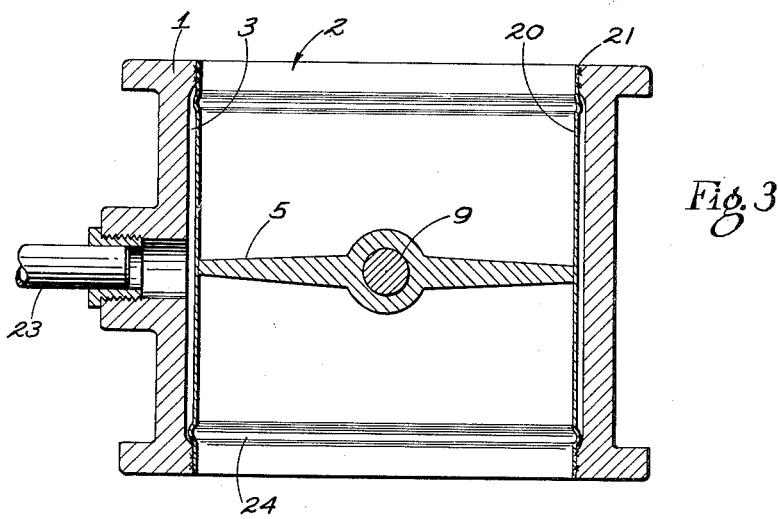
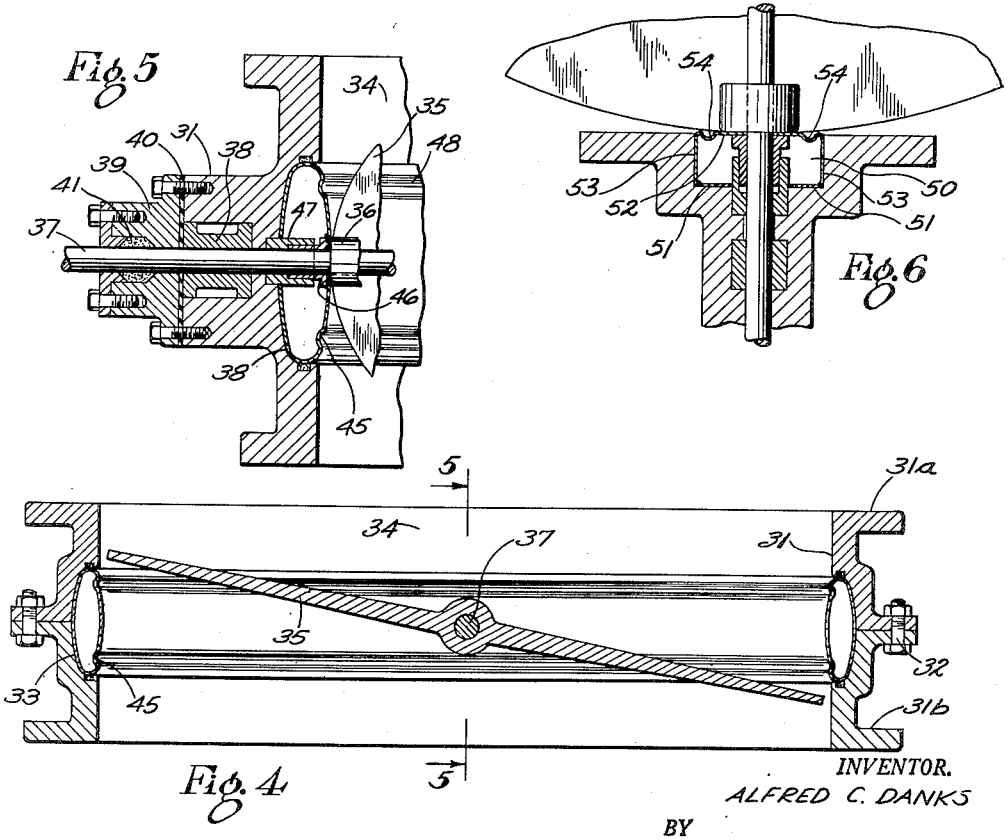
INVENTOR.
ALFRED C. DANKS
BY
Richey & Watts
ATTORNEYS

INVENTOR.
ALFRED C. DANKS

Patented Mar. 30, 1954

2,673,708

UNITED STATES PATENT OFFICE 2,673,708

FLUID PRESSURE SEALED BUTTERFLY VALVE

Alfred C. Danks, Vermilion, Ohio

Application September 28, 1950, Serial No. 187,254

9 Claims. (Cl. 251—173)

This invention relates to valves of the butterfly type and is particularly concerned with such valves having new means for sealing against the flow of gases past the valve disc when in closed position.

Butterfly valves, as constructed by others heretofore, have possessed a pronounced tendency to leakage of gases past the shaft portions of the discs when the discs are in closed position. While it is comparatively easy to seal other parts of the periphery of the disc against leakage of gases therepast, no other worker in the art has been able to seal around the shaft portions of the disc satisfactorily so far as I know. In my prior Patent No. 2,488,380 (Re. 23,613) is disclosed a valve provided with means which do effectively seal about the shafts. In the present invention general principles of sealing which are disclosed in that patent are combined with new structures which provide new combinations of parts having new capabilities, modes of operation and results.

The present invention will be better understood by those skilled in the art from the following specification including the detailed description of embodiments of the present invention and the accompanying drawings, in which:

Fig. 3 is a cross-sectional view taken on line 3—3 of Fig. 1;

Fig. 4 is a view similar to Fig. 3 but showing another embodiment of the invention;

Fig. 5 is a fragmentary, sectional view taken on line 5—5 of Fig. 4;

Fig. 6 is a cross-sectional view similar to Fig. 5 but showing still another embodiment of the invention;

Figure 1:
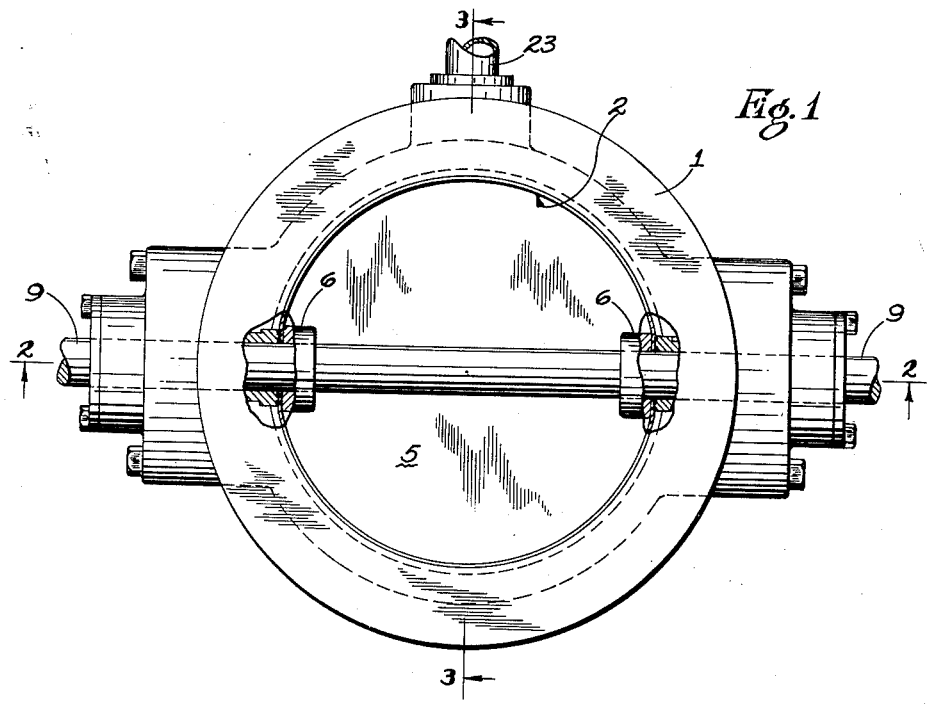
Fig. 1 is an end elevational view, partly in section, of a butterfly valve embodying the present invention.
Figure 2:
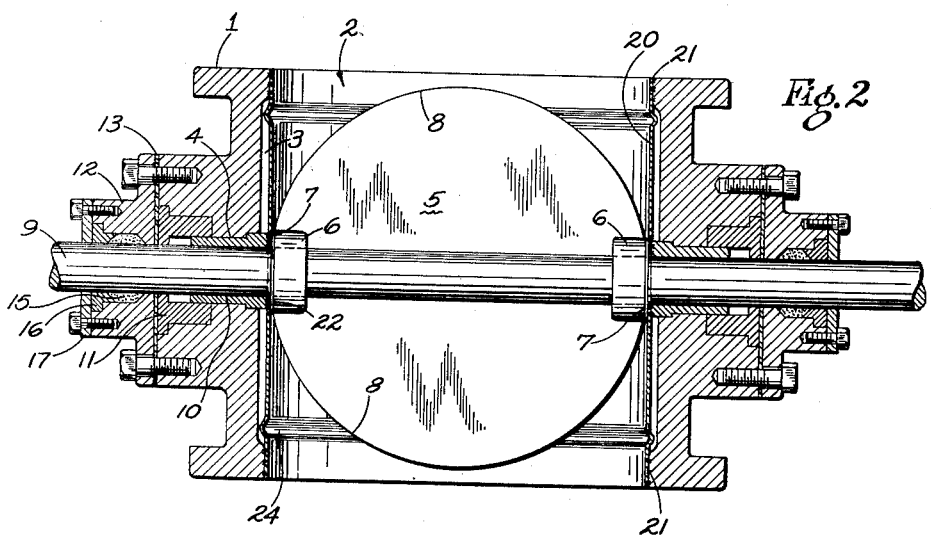
Fig. 2 is a cross-sectional view taken on line 2—2 of Fig. 1.

The valve of Figs. 1, 2 and 3 comprises a body 1 having a cylindrical passage 2 therethrough, an annular recess 3 opening into the passage, and opposed, radial, shaft-receiving apertures 4. The disc 5 has diametrically opposed hubs 6 provided with plane end surfaces 7. The periphery of the disc 5 is made up of two substantially semi-circular edge surfaces 8 connected by surfaces 7 which are chords of the circle defined by said semi-circular edges. A shaft 9 extends through the disc and the central portions of surfaces 7 and projects through apertures 4. The surfaces 7 are disposed at substantially right angles to the axis of shaft 9.

Bushings 10 surround shaft 9, afford bearings therefor and have a sliding fit for endwise movement in apertures 4. At their outer ends bushings 10 extend into housings 11 which are seated in body 1 and are held in place by plates 12 attached to the body, with gaskets 13 preferably being interposed between the plate and body to serve as fluid seals. Plates 12 constitute stuffing boxes for the shafts and contain packing 15 which is held in place by rings 16 and covers 17. Thus, escape of fluid out of the valve from passage 2 along shaft 9 is prevented by the stuffing box and gasket.

A resilient, circumferentially continuous ring 20 is attached to body 1 as by welding indicated at 21 and closes the opening of recess 3 into passage 2. As shown in these figures, where the ring and body are of approximately the same axial length ring 20 defines passage 2. This ring 20 has holes formed therein to receive shaft 9 and the ring is secured about these holes, as by welding indicated at 22, to the inner ends of bushings 10. The portions of ring 20 adjacent its inner periphery are opposed to and may be engageable with the plane surfaces 7 of hub 6 on an annular contact area around the shafts 9.

Ring 20 and body 1 define a space for fluid pressure. In other words, the recess 3, which is formed in the body 1, is closed at its open side by ring 20 and becomes a space into which fluid under pressure may be confined. A conduit 23, which may be equipped with a valve if desired, is provided to conduct fluid under pressure into the space.

It will be noted that ring 20 has two corrugations 24, one on either side of the shaft 9, the purpose of which is to permit movement of the ring 20 inwardly of the body and into contact with the periphery of the disc 5 without substantial stretching of the ring axially. More than two corrugations may be used if desired but usually are unnecessary due to the slight amount of axial extension which is required. When fluid under pressure is admitted through conduit 23 and presses against the outer side of ring 20, the corrugations will deform readily under fairly low gas pressure with attendant movement of the ring and bushings inwardly into contact with the entire periphery of the disc including the plane, chordal surfaces at the outer ends of the hubs. By varying the pressure of the fluid so applied against its outer surface, the ring may be pressed against the periphery of the disc with various pressures, and, hence, the valve may be sealed against flow therethrough of gas under various pressures. The flexibility afforded by corrugations 24 insures that the desired sealing contacts between the ring and disc may be obtained without undue stresses being placed on the connections of the ring to the body.

In the modification shown in Figs. 4 and 5, the body 31 consists of two similar parts 31a and 31b secured together as by bolts 32. These parts define a groove 33 which opens into the cylindrical passage 34 through the body. The disc 35 is provided with hubs 36 and a shaft 37 which extends through the body and the disc. Near its outer ends the shaft 37 passes through bearings 38 mounted in body 31 and is retained in place by plates 39 attached to the body with gaskets 40 preferably being interposed between the plates and body. Stuffing boxes 41 surround the outer ends of the shaft and insure against the escape of fluid around the shaft from passage 34.

An endless resilient hollow ring 45 is disposed in recess 33. Means in the form of a conduit (not shown) is provided through which fluid under pressure may be brought into the interior of ring 45. Bushings 46 are disposed within ring 45 at diametrically opposite points to receive shaft 37 and the inner ends of these bushings 46 are secured, for example, as by welding, to the inner portions of ring 45 surrounding the shaft. The inner ends of bushings 46 and the attached peripheral portions of ring 45 are opposed to the plane, sector-shaped, end surfaces of hubs 36 and are engageable with the ends of those hubs on an annular contact area around shaft 37. Guides 47 surround shaft 37, extend through the outer wall of ring 45 and are fixed in position in body 1. Bushings 46 have a sliding fit in guides 47. These guides are secured, for example, by welding to the outer wall of ring 45.

Ring 45 is provided with opposite annular corrugations 48 in opposite sides of shaft 37. Preferably two corrugations 48 are employed although in certain cases one corrugation or more than two corrugations may be used if desired.

The operation of the apparatus shown in Figs. 4 and 5 is quite like the above described operation of the device of Figs. 1, 2 and 3. When fluid under pressure is brought into the interior of ring 45 it presses the inner, corrugated wall against the periphery of the disc 35 and bushings 46 against the chordal end surfaces of the hubs around the shaft with fluid sealing contact, and the amounts of sealing pressure so exerted may be varied in accordance with the pressure of the fluid in the ring.

In Fig. 6 is shown a modified form of the invention in which the valve body is provided with a recess 50 generally rectangular in cross-section and a built up or multipart, hollow, resilient ring is placed therein. This ring may consist of a plurality of parts, for example, outer and inner parts 51 and 52 and edge parts 53, all suitably joined together as, for example, by edge surface welding. This ring 50 may be provided with one or more corrugations 54 for the same purpose as those for which the corrugations 24 of Fig. 2 and 45 of Fig. 4 were employed. This ring may be associated with the hub ends and shaft of the valve after the manner shown in Fig. 4 or in any other suitable desired manner.

Figure 7:
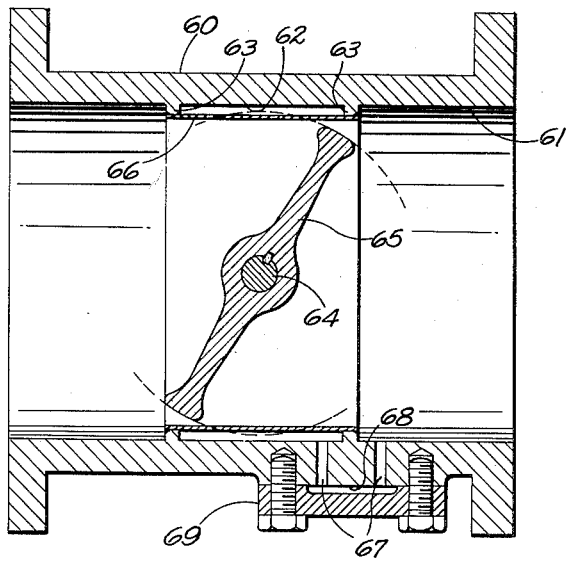
Fig. 7 is a view similar to Fig. 4 but showing still another embodiment of the invention.
Figure 8:
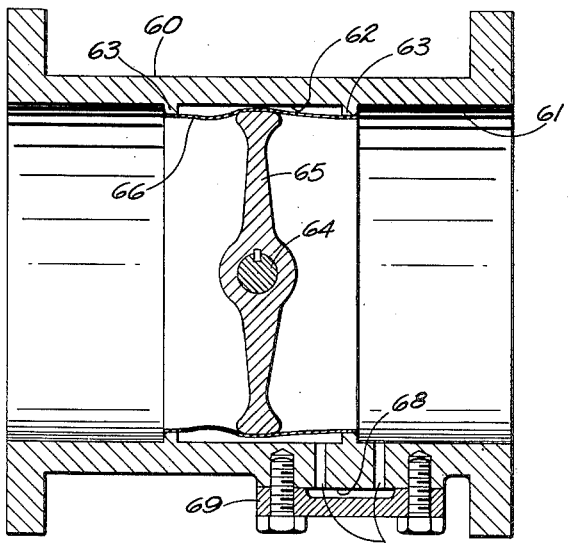
Fig. 8 shows the apparatus of Fig. 7 with the vane in closed position.

In the embodiment of the invention shown in Figs. 7 and 8, the body 60 is shown as being made in one piece after the fashion of body 1 in Figs. 1 to 3 but obviously may be made in two parts after the manner shown in Fig. 4. This body has a cylindrical passage 61 extending therethrough and an annular recess 62 opening into the passage and partly defined by annular ribs 63 which are disposed on opposite sides of the opposed radial apertures (not shown) which are to receive the shaft 64. This shaft is keyed to the disc 65 and this disc has a periphery which, like the peripheries of the discs of Figs. 1 to 6 hereof, is composed of two substantially semi-circular portions connected by two surfaces which are chords of the circle defined by said semi-circular edges. Preferably, bushings are mounted in the body for endwise sliding movement in guides around shaft 64 and are connected at their inner ends to a resilient metal ring 66, all substantially as shown in Fig. 2.

The ring 66 is preferably composed of resilient metal which is quite thin and is connected at its ends to ribs 63 as by welding. This ring 66 has an internal diameter when installed which is slightly less than the outside diameter of disc 65. By reason of this small difference in sizes of the parts the disc 65 when turned to closed position will press against ring 66 and force it outwardly perhaps with some slight stressing or stretching of the metal thereof but with the result that a good fluid sealing contact will be made throughout the periphery of the disc.

A modified means of providing fluid pressure to act on the ring 66 and press it against the disc 65 is indicated by passages connecting the up stream or high pressure side of the valve with recess 62. As shown in Fig. 7, body 60 is provided with two radial holes 67 extending through the body, one hole being disposed between ribs 63. These two holes connect with each other through the space 68 defined by a recessed plate 69 which is connected to the outside of the body and encloses the outer ends of holes 67.

When valve 65 is turned to closed position with high pressure fluid on the right-hand side thereof, as seen in Fig. 7, fluid under pressure may flow through holes 67 into the recess 62. So long as the fluid pressure on the down stream side, i. e., on the left side of the disc as seen in Fig. 7 is the same as on the up stream or right-hand side, the pressure on the inner and outer sides of ring 66 will be approximately equal but, if and when the pressure on the low pressure side, i. e., the left side of disc 65, falls, then the pressure in recess 62 on the down stream side of disc 65 will tend to move the ring 66 inwardly and thereby press it more strongly against the outer periphery of the disc. Fig. 8 illustrates both of the above described sealing conditions. It shows that disc 65 in closed position has forced the ring 66 outwardly slightly and it also shows that on the down stream side the fluid pressure in the recess has tended to press the ring inwardly against the down stream side of the disc. It will be understood that Fig. 8 shows the deviations of the ring greatly exaggerated.

The operation of the apparatus of Figs. 7 and 8 will be understood from the foregoing description without further amplification it is believed.

The resilient rings above described in the various illustrated embodiments of the present invention are preferably composed of metal and such metal may be of various compositions and physical properties depending upon the service conditions which are to be satisfied. For many commercial purposes, ordinary steel may be used but, for other purposes, stainless steel, Monel metal, copper and any other metal suitable for the particular purpose at hand may be used.

It will be understood that the present invention is not limited to valves or butterflies which are disc-shaped, i. e., have arcuate peripheral portions, but may be employed quite advantageously with valves of other geometrical shapes, for example, valves which are rectangular or square or other angular shapes. One important accomplishment of the invention is the sealing against air flow about the shaft means of the valve and this is attainable in valves of these different shapes by means of this invention.

Having thus described the present invention so that others skilled in the art may be able to understand and practice the same, I state that what I desire to secure by Letters Patent is defined in what is claimed.

What is claimed is:

1. A valve comprising a body having a cylindrical passage extending therethrough, an annular recess surrounding and opening into said passage and opposed, radial, shaft-receiving apertures extending outwardly from said recess, a disc in the passage having a periphery which is substantially a circle, diametrically opposed hubs having plane end surfaces constituting chords of said circle, and a shaft extending radially from the central portion of said plane surfaces into said apertures, bushings around said shafts opposed to said plane end surfaces and slidably mounted in said body, a circumferentially continuous, resilient, metal ring in the body secured to said bushings and with the walls of said recess defining a closed annular space around said passage for fluid under pressure and means to conduct fluid under pressure into said space for pressing said ring into fluid sealing engagement with the periphery and plane surfaces of said disc when the disc is in closed position.

2. A valve comprising a body having a cylindrical passage extending therethrough, an annular recess surrounding and opening into said passage and opposed, radial, shaft-receiving apertures extending outwardly from said recess, a disc in the passage having a periphery which is substantially a circle, diametrically opposed hubs having plane end surfaces constituting chords of said circle, and a shaft extending radially from the central portion of said plane surfaces into said apertures, bushings around said shafts opposed to said plane end surfaces and slidably mounted in said body, a circumferentially continuous, resilient, hollow, expansible metal ring in the body, closing said opening of the recess into said passage and secured to said bushings, said ring defining a closed annular space around said passage for fluid under pressure, and means to conduct fluid under pressure into said ring for pressing said bushings along said shaft and expanding said ring and pressing it into fluid sealing engagement with the periphery and plane surfaces of said disc when the disc is in closed position.

3. A valve comprising a body having a cylindrical passage extending therethrough, an annular recess surrounding and opening into said passage and opposed, radial, shaft-receiving apertures extending outwardly from said recess, a disc in the passage having a periphery which is substantially a circle, diametrically opposed hubs having plane end surfaces constituting chords of said circle and a shaft extending radially from the central portion of said surfaces into said apertures, guides in the body around said shaft, bushings around said shafts opposed to said plane end surfaces and slidably mounted in said guides, a circumferentially continuous, hollow, resilient, metal ring positioned in said recess in the body around said passage, said ring closing the opening of said recess into said passage, the inner wall of said ring being secured to said bushings, and means to conduct fluid under pressure into said ring for pressing said bushings along said shaft and pressing said ring into fluid sealing engagement with the periphery and plane surfaces of said disc when the disc is in closed position.

4. A valve comprising a body having a cylindrical passage extending therethrough, an annular recess surrounding and opening into said passage and opposed, radial, shaft-receiving apertures extending outwardly from said recess, a disc in the passage, a circumferentially continuous, hollow, resilient, metal ring positioned in said recess in the body around said passage and closing the opening of the recess into said passage, a shaft extending radially outward from the disc through said body, guides in the body around said shaft and projecting through the outer wall of said ring, bushings opposed to adjacent surfaces of the disc around the shaft secured to and projecting outwardly from the inner wall of said ring and having a sliding fit in said guides, and means to conduct fluid under pressure into said ring for pressing said bushings along said shaft and pressing the inner wall of said ring into fluid sealing engagement with the periphery of said disc when the disc is in closed position.

5. A valve comprising a body having a cylindrical passage extending therethrough, an annular recess surrounding and opening into said passage and opposed, radial, shaft-receiving apertures extending outwardly from said recess, a circumferentially continuous, hollow, resilient, metal ring positioned in said recess and having a corrugated inner wall around said passage and closing the opening of said recess into said passage, a disc in the passage having a periphery engageable throughout its circumferential length with said ring, a shaft extending through said disc and into said apertures, guides in the body around said shaft and projecting through the outer wall of said ring, bushings opposed to adjacent surfaces of the disc around said shafts secured to and projecting outwardly from the inner wall of the ring and fitting slidably into said guides, and means to conduct fluid under pressure into said ring for pressing said bushings along said shaft and pressing the inner wall of said ring into fluid sealing engagement with the periphery of said disc when the disc is in closed position.

6. A valve comprising a body having a cylindrical passage extending therethrough and an annular recess around said passage, a hollow, corrugated, metal ring in said recess in said body around said passage and closing the opening of the recess into said passage, a disc in the passage, shaft means projecting from said disc through said ring and into said body, bushings around said shaft extending outwardly from and secured to the inner wall of said ring, guides extending through and secured to the outer wall of said ring and slidably receiving said bushings, and means to conduct fluid under pressure into said ring for pressing said bushings along said shaft and pressing the inner wall of said ring into fluid sealing engagement with the periphery 7. A valve comprising a body having a cylindrical passage therethrough, an annular recess surrounding and opening into said passage and opposed, radial, shaft-receiving apertures extending outwardly from said recess, a disc in the passage, a shaft supporting said disc and extending into said shaft-receiving openings, a resilient metal ring closing the said opening of said recess, said ring having an inside diameter slightly less than the outside diameter of said disc, bushings around the shaft slidable endwise in said shaft-receiving openings and connected to said ring, and means to conduct high pressure fluid from the upstream side of the disc into said recess and against said ring to press the latter against said disc with fluid sealing contact when the disc is in closed position.

8. A valve comprising a body having a cylindrical passage therethrough, axially spaced, inwardly projecting ribs defining an annular recess surrounding and opening into said passage, said body having opposed, radial, shaft-receiving apertures extending outwardly from said recess, a disc in the passage, a shaft supporting said disc and extending into said shaft-receiving openings, a resilient, thin, sheet metal ring secured to the inner peripheries of said ribs and closing the opening of said recess into said passage, bushings around the shaft slidable endwise in said shaft-receiving openings and connected to said ring, and means to conduct high pressure fluid from the upstream side of the disc into said recess and against said ring to deform and press the latter against said disc with fluid sealing contact when the disc is in closed position.

9. A valve comprising a body having a passage extending therethrough, an annular recess surrounding and opening into the passage and opposed, shaft-receiving apertures extending outwardly from said recess, a valve in the passage, a shaft supporting said valve and extending into said shaft-receiving apertures, bushings around said shafts projecting into and slidably mounted in said body, said bushings being opposed to adjacent surfaces of the valve around said shaft, a circumferentially continuous, resilient, metal ring in the body closing said opening of the recess into said passage and secured to said bushings and together with the walls of said recess defining a space for fluid under pressure and means to conduct fluid under pressure into said space for pressing said bushings along said shaft toward said valve and for pressing said ring into fluid sealing engagement with the periphery of said valve when the disc is in closed position.

ALFRED C. DANKS.

References Cited in the file of this patent

UNITED STATES PATENTS

| Number | Name | Date |
|---|---|---|
| 1,598,564 | Earnshaw | Aug. 31, 1926 |
| 1,813,126 | Sheppard | July 7, 1931 |
| 1,834,870 | Rogers | Dec. 1, 1931 |
| 1,834,988 | White | Dec. 8, 1931 |
| 1,844,641 | Wein | Feb. 9, 1932 |
| 1,990,309 | Phillips | Feb. 5, 1935 |
| 2,054,369 | Francis | Sept. 15, 1936 |
| 2,059,656 | Ring | Nov. 3, 1936 |
| 2,488,380 | Danks | Nov. 15, 1949 |